3,419,535
ACYLATED MELAMINE DERIVATIVES
Peter Schlumbom, Therwil, Basel-Land, Switzerland, assignor to Geigy Chemical Corporation, Greenburgh, N.Y., a corporation of Delaware
No Drawing. Continuation-in-part of application Ser. No. 255,651, Feb. 1, 1963. This application Jan. 19, 1966, Ser. No. 521,553
Claims priority, application Switzerland, Feb. 6, 1962, 1,431/62
11 Claims. (Cl. 260—88.1)

This application is a continuation-in-part of my pending application Ser. No. 255,651, filed Feb. 1, 1963, now abandoned.

The present invention concerns new acyl melamine compounds, a process for the production thereof, their use for the production of polymerizates, as well as, as industrial product, the polymerizates produced with these compounds.

It has been found that valuable acyl melamine compounds are obtained if a compound of the formula

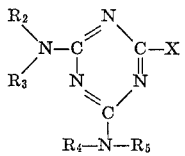

(I)

is reacted with a compound of the formula

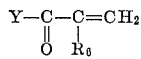

(II)

in which formulas

X is an acylatable amino group,
Y is a mobile substituent which can be split off as anion,
$R_2$, $R_3$, $R_4$ and $R_5$ independently of each other each represent a saturated or unsaturated aliphatic radical, a cycloaliphatic, araliphatic, aromatic or heterocyclic radical and each of the pairs $R_2$ and $R_3$ and/or $R_4$ and $R_5$ together with the amino nitrogen atom also represent a heterocycle which may include further hetero atoms, and
$R_6$ represents hydrogen or an alkyl radical, to form a compound of the formula

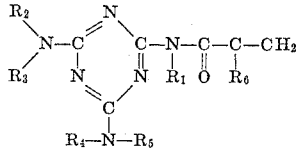

(III)

wherein $R_2$, $R_3$, $R_4$, $R_5$ and $R_6$ have the meanings given above, and $R_1$ represents hydrogen or a substituent as defined for $R_2$.

More particularly, the invention relates to compounds of the above Formula III in which $R_1$ is hydrogen or alkyl with maximally 18 carbon atoms, alkenyl with from 3 to maximally 18 carbon atoms, unsubstituted cycloaliphatic radicals with 5 to 7 carbon atoms, mononuclear carbocyclic arylalkyl radicals with from 6 to 10 carbon atoms, unsubstituted, lower alkyl-substituted, fluoroalkyl-substituted, chloro-substituted, bromo-substituted, fluoro-substituted and alkoxy-substituted mononuclear carbocyclic aryl radicals,
each of $R_2$, $R_3$, $R_4$ and $R_5$ have the same meaning as $R_1$ except hydrogen, and each of the pairs $R_2+R_3$, and $R_4+R_5$, taken together, represents —$(CH_2)_4$—, —$(CH_2)_5$—, —$(CH_2)_6$—, —$(CH_2)_2$—O—$(CH_2)_2$—, and $R_6$ is hydrogen or alkyl with maximally 3 carbon atoms, with the proviso that at least one of $R_1$ and $R_6$ is hydrogen, particularly in the case of homopolymerization, while, in the case of copolymerization with other monomers, this condition need not be fullfilled.

When each of $R_1$, $R_2$, $R_3$, $R_4$ and $R_5$ represents a saturated aliphatic radical then this is, for example, an alkyl group such as the methyl, ethyl, a propyl, butyl, amyl, hexyl, octyl, decyl, dodecyl, tetradecyl, hexydecyl, octadecyl or eicosyl group; and alkoxyalkyl groups such as the 2-methoxy-ethyl, 2-ethoxy-ethyl, 2- or 3-methoxy-propyl, 2- or 3-ethoxy-propyl, or 2- or 3-octyloxy-propyl group; an alkylthioalkyl group such as the 2-methyl-thio-ethyl or 2-ethyl-thioetyl group or a cyanoalkyl group, e.g. the cyanoethyl group. Examples of unsaturated aliphatic radicals $R_1$, $R_2$, $R_3$, $R_4$ and $R_5$ are the allyl, methallyl, ethallyl or oleyl radicals, examples of cycloaliphatic radicals are the cyclohexyl, phenylcyclohexyl or cyclopentyl radicals, examples of aralinphatic radicals are the benzyl, an alkylbenzyl, halogenobenzyl or the phenethyl radical and examples of aryl radicals are the phenyl, diphenyl or an alkylphenyl, a halogenophenyl or an alkoxy-, cycloalkoxy-, aralkoxy- or aryloxy-phenyl radical or a naphthyl radical. If $R_2$ and $R_3$ and/or $R_4$ and $R_5$, each together with the amino nitrogen atom to which they are linked, are a heterocycle, then this is, for example, the piperidine or a morpholine ring. $R_6$ is hydrogen or, for example, a methyl, ethyl, propyl or butyl group.

In the meaning of mobile substituent which can be split off as anion, Y in Formula II is, for example, halogen such as chlorine or bromine, or the

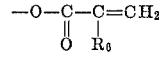

radical.

A preferred method of performing the process according to the invention consists in using a compound of Formula I in which X is an —$NH(R_1)$ group and a compound of Formula II in which Y is an

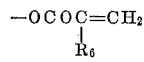

group, $R_1$ and $R_6$ having the meanings given under Formula II.

Examples of compounds of Formula I which are employed by this method are the 2-amino-, 2-arylamino, 2-alkylamino- or 2-aralkylamino - 4,6 - bis-(disubstituted amino)-1,3,5-triazine compounds.

They are obtained by reacting 1 mol of cyanuric halide with one mol each of the desired amine of the formulas $R_2(R_3)NH$, $R_4(R_5)NH$ and $R_1NH_2$. The reaction is performed in any order desired by the usual methods.

Compounds of Formula II to be reacted therewith are, for example, the halides of acrylic acid, methacrylic acid, ethyl acrylic acid, propyl acrylic acid or butyl acrylic acid; however, the anhydrides of those acids are used advantageously, for example, acrylic acid anhydride.

The reaction is performed at a temperature of about 15° to 150° C., preferably by heating the two starting materials, without or with an inert solvent with a boiling point above 50° C.

Advantageously an excess of compound of Formula II is used. Suitable solvents are, e.g. aromatic hydrocarbons which may be halogenated such as benzene, toluene, 1,2-dichlorobenzene or alkyl halides such as ethylene dichloride. The reaction is performed advantageously in the presence of polymerization inhibitors such as methylene blue, tannin, phenol, resorcin, hydroquinone, quinones, ascorbic acid, isoascorbic acid, phenyl-α-naphthylamine, N,N-di-2-naphthyl-p-phenylenediamine, copper powder or certain copper-(II)-salts such as copper-(II)-acetate.

In the aforesaid method, the components are advantageously so chosen that in the end product of Formula III at least one of $R_1$ and $R_6$ is hydrogen, since such acyl melamines are suitable for unipolymerization. Polymerization can also be effected when $R_1$ is an unsaturated group which is capable of addition, i.e. an allyl or methallyl radical. In principle, all acyl melamine compounds mentioned according to the invention are capable of copolymerisation with other polymerisable substances.

Compounds which can be copolymerised with substances according to the invention are, in principle, all those which contain at least one

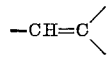

group wherein from one to two of the three free bonds can also be occupied by hydrogen atoms, which group is capable of addition, for example, esters of unsaturated alcohols such as allyl-, methallyl-, crotyl-, 1-chloroallyl-, 2-chloroallyl-, cinmamyl-, vinyl-, methyl vinyl-, 1-phenyl allyl- or butenyl-alcohol with saturated and unsaturated aliphatic, cycloaliphatic and aromatic mono- and polybasic acids such as formic acid, acetic acid, propionic acid, butyric acid, valeric acid, caproic acid, stearic acid, acrylic acid and α-substituted acrylic acids such as methyl acrylic acid, ethyl acrylic acid, propyl acrylic acid or phenyl acrylic acid or α-acyloxy acrylic acid or α-halogen acrylic acids such as α-chloroacrylic acid or crotonic acid, oxalic acid, malonic acid, succinic acid, glutaric acid, adipic acid, azelaic acid, sebacic acid, fumaric acid, citraconic acid, mesaconic acid, itaconic acid, aconitic acid, benzoic acid, hexahydrobenzoic acid, phenyl acetic acid, phthalic acid, hexahydrophthalic acid, terephthalic acid, benzoyl phthalic acids or n-butyl sulphonic acid, p-toluene sulphonic acid or cyanuric acid for example triallyl cyanurate; also esters of saturated monovalent alcohols such as methyl-, ethyl-, propyl-, isopropyl-, n-butyl-, sec. butyl-, 1,1-dihydroperfluorobutyl-, amyl-, or stearyl alcohol with unsaturated aliphatic mono- or polybasic acids such as acrylic acid or methacrylic acid, in addition free unsaturated acids such as acrylic acid, methacrylic acid or phenyl acrylic acid; also vinyl-substituted cyclic compounds such as styrene, o-, m- and p-chlorostyrene, -bromostyrene, -fluorostyrene, -methylstyrene, -trifluoromethylstyrene, -ethylstyrene, -cyanostyrene, di-, tri- and tetrachlorostyrenes, -bromostyrenes, -fluorostyrenes, -methylstyrenes, -ethylstyrenes, -cyanostyrenes, allylcyanostyrenes, α-substituted styrenes and their derivatives substituted in the ring such as: α-methyl styrene, α-methyl-p-methylstyrene, vinyl naphthalenes, vinyl cyclohexanes, vinyl furans, vinyl pyridines, divinyl benzenes, N-vinyl carbazoles, N-vinyl-pyrrolidiones; unsaturated ethers, e.g. ethyl vinyl ether, diallyl- or ethyl- methallyl ethers; unsaturated amides such as N-vinyl- or N-allyl-caprolactam, or acrylic acid amide, methacrylic acid amide and ethyl acrylic acid amide as well as their N-substituted derivatives, e.g. N-acryloyl piperidine, N-β-pyrrolidinoethyl acrylic acid amide, N-γ-diethylaminopropyl methacrylic amide, N-vinyl amides, e.g. N-vinyl-N'-methylacetamide, N-vinyl imides such as N-vinyl phthalimide or N-vinyl succinimide, N-vinyl ureas such as N-vinyl-N'-ethyl urea, N-vinyl urethanes, the nitriles of unsaturated carboxylic acids such as acrylonitrile, methacrylonitrile, ethylacrylonitrile or phenylacrylonitrile, unsaturated ketones such as methylvinyl or methylallyl ketone, vinyl sulphoxides such as methylvinyl sulphoxide, methylene malonic acid esters e.g. methylene malonic acid methyl or ethyl ester, unsaturated aliphatic hydrocarbons such as ethylene, propylene or butadiene such as 1,3-butadiene, isoprene, 2-chlorobutadiene, esters of unsaturated polyvalent alcohols such as vinylene-diol or butene diol with saturated and unsaturated aliphatic and aromatic mono- and poly- basic acids such as vinylene carbonate, unsaturated glycide esters such as gylcide acrylate, -methacrylate, -itaconate, -allylphthalate, also vinyl halides such as vinyl fluoride, vinyl chloride, vinyl bromide or vinyl iodide, vinylidene compounds, e.g. vinylidene chloride, vinylidene fluoride, vinylidene iodide vinylidene cyanide, also tetrafluoroethylene or chlorotrifluoroethylene, in addition silicium organic compounds such as triethoxy vinyl silicane, trimethyl vinyl silicane and phosphorus organic compounds such as diethylvinyl phosphonate.

The acylmelamines are polymerized or copolymerized, as desired, by known methods, for example, with heat, light (particularly ultraviolet light) and, mainly, with catalysts, especially those which easily form radicals. Suitable catalysts of this type are: inorganic peroxides, e.g. hydrogen peroxide, barium peroxide or magnesium peroxide, or salts of inorganic per acids such as ammonium, sodium or potassium persulphate, percarbonate, perborate or perphosphate; but particularly the following organic peroxides: the dialkyl peroxides with alkyl of up to 18 carbon atoms, namely diethyl, dipropyl, dilauryl, dioleyl, distearyl, di-tert. butyl and di-tert. amyl peroxides, lower alkyl hydrogen peroxides, particularly tert.butyl hydrogen peroxide, tert. amyl hydrogen peroxide, and of the diacyl peroxides, particularly diacetyl, dipropionyl, dilauroyl, dibenzoyl, succinyl or phthaloyl peroxides, coconut oil fatty acid peroxides, acetylbenzoyl peroxides, propionylbenzoyl peroxide and, also, of the terpene peroxides, particularly ascaridol, all of which are defined in the appended claims by the term "benzoyl peroxide-type catalyst," and further the azo compounds triphenylmethyl azobenzene, 1-azo-bis-1-phenylethane, 1-azo-bis-1-p-methoxyphenylethane, 1-azo-bis-1-p-chlorophenylethane, 2-azo-isobutyronitrile, 2-azo-isobutyric acid dimethyl and diethyl esters, p,p'-dinitro-diphenyl-azo-sulphone and potassium-azo-disulphonate, which are defined in the appended claims as "azoisobutyronitrile-type catalyst." In some cases, in particular in copolymerisations with other monomers mentioned supra, also certain Lewis acids are suitable as polymerisation catalysts, namely borotrifluorodiethyl ether complexes, concentrated sulphuric acid, as well as such anionic catalysts, as lithium hydride, tetraethyl lithium aluminium, ethyl sodium, butyl lithium, ethyl magnesium bromide or naphthyl sodium.

These catalysts are used singly or, depending on their compatibility, in mixtures also and they are used in a ratio of about 0.01% (calculated on the total weight of the substances to be poymerised) up to about 5% by weight.

The polymerization is performed in substance, in solution, suspension or emulsion. If the polymerization is performed in solution, then solvents can be chosen in which either the monomers and also the polymers formed are suitable or in which only the monomers are soluble. Suitable solvents are, e.g. hydrocarbons which may be halogenated, especially benzene, ethylbenzene, toluene, xylene, chlorinated benzene and chlorinated lower alkanes, particularly ethylene dichloride; other suitable solvents are, in the second line, ethers, e.g. dibutyl ether, esters such as butyl acetate, ketones such as methylethyl ketone or tertiary alcohols e.g. tert. butanol, tert. amyl alcohol or tert.hexyl alcohol etc. Preferred are primary alcohols with maximally 4 carbon atoms, especially for polymerization in solution.

Polymerizates according to the invention are obtained, for instance, by polymerization in solution which is preferably performed at a temperature of at least about 30° C. and higher, and up to the boiling point of the polymerization mixture, in a primary alcohol with maximally 4 carbon atoms, or in a suitable hydrocarbon solvent as mentioned above, and in the presence in the polymerization mixture of an azoisobutyronitrile-type polymerization catalyst.

Other polymers according to the invention are obtained by polymerization in water which is preferably performed at a temperature of about 30° to 90° C. in the presence, in the polymerization mixture, of a benzoyl peroxide-type polymerization catalyst and a minor amount of a suspension stabilizing agent of the polyvinyl alcohol type, or inorganic compounds in the form of water-soluble powders or precipitates (see Schildknecht, High Polymers, X, p. 73 et seq., particularly pp. 80/81 (1956)).

Further polymerizates according to the invention are produced by emulsion polymerization, which is performed at a temperature of about 15° to 90° C., and preferably 30° to 80° C. in the presence, in an aqueous emulsion, of a benzoyl peroxide-type polymerization catalyst, or, preferably a water-soluble peroxide catalyst such as an alkalimetal or ammonium peroxy disulfate, or hydrogen peroxide, or alkali metal perborate and similar water soluble peroxides and peroxy salts, and redox-polymerization catalysts such as $K_2S_2O_8+NaHSO_3$, as well as a standard emulsifying agent, either of the anionic type, for instance, the sodium salt of sulfonsuccinic acid dioctyl ester, or preferably mixtures of anionic and non-ionic type emulsifiers (see "Acrylic Resins" by M. B. Horn, p. 106 et seq., Reinhold Plastics Application Series, 1960).

The above described homopolymerizates and copolymerizates can be used alone or in combination with each other for the manufacture of molded articles, coating masses, binding layers such as intermediate layers of safety-glass. Furthermore the polymerizates and copolymerizates may be used as adhesives and for the impregnation of paper. The molded articles can be produced in situ as well as by subsequent molding of, for instance, polymer granulates, in combination with conventional fillers or other conventional adjuvants under standard conditions of temperature and pressure.

The polymerizates according to the invention, obtained by the above described methods, consist of a plurality of repeating units of the formula

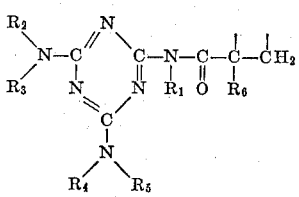

wherein $R_1$, $R_2$, $R_3$, $R_4$, $R_5$ and $R_6$ have the same meanings as above, and the average molecular weight of these polymerizates depends on the degree of polymerization, which is preferably equal to at least 40 and higher, up to about 400.

The preferred polymerizates according to the invention then have average molecular weights in the range between 10,000 and 100,000.

The copolymerizates according to the invention obtained as described hereinbefore contain repeating units of the foregoing formula which are interspersed with the repeating units of the copolymerized ethylenic monomer, in a number depending on the weight ratio of the triazine derivatives according to the invention to the said ethylenic monomer.

The new polymeric and copolymeric synthetic substances produced by the use of the acyl melamine compounds of Formula III are distinguished by good thermostability.

Further details can be seen from the following examples. Where not otherwise expressly stated, parts and percentages are given by weight. The temperatures are in degrees centigrade. The relationship of parts by weight to parts by volume is as that of grams to cubic centimeters. Intrinsic viscosities are given in 100 ml. per gram.

EXAMPLE 1

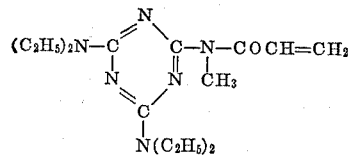

76 parts of acrylic acid anhydride are added while stirring at 0–10° to 50.4 parts of 2-methylamino-4,6-bis-diethylamino-1,3,5-triazine and 0.4 part of hydroquinone. The solution is heated to 70° and kept for 1 hour at this temperature. The acrylic acid formed and the excess anhydride are evaporated off and the residue is distilled under high vacuum. 51 parts of 2-acryloyl-N-methyl-amino-4,6-bis-diethylamino - 1,3,5 - triazine (83% of the theoretical) are obtained as a colorless oil. B.P.: 152-155° at 0.1 mm. Hg. $n_D{}^{25}=1.5366$.

EXAMPLE 2

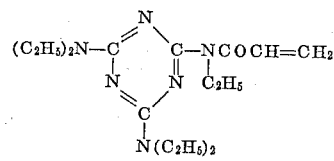

38 parts of acrylic acid anhydride are added while stirring at 0–10° to 27 parts of 2-ethylamino-4,6-bis-diethylamino-1,3,5-triazine and 0.2 part of picric acid as inhibitor. The solution is heated in a water bath to 70° and kept for 1 hour at this temperature. The acrylic acid and the excess anhydride are then evaporated off and the residue is distilled under high vacuum over a copper spiral. 24 parts of 2-acryloyl-N-ethylamino-4,6-bis-diethylamino-1,3,5-triazine are obtained (75% of the theoretical) in the form of a colourless oil which boils at 178–182° at 0.3 mm. Hg. $n_D{}^{25}$: 1.5330.

EXAMPLE 3

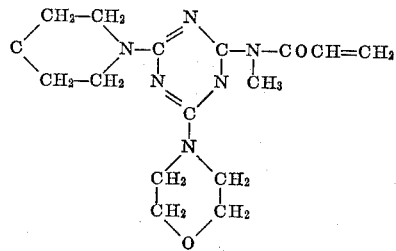

42 parts of 2-methylamino-4,6-bis-N-morpholino-1,3,5-triazine, 0.5 part of hydroquinone, 30 parts of toluene and 28.5 parts of acrylic acid anhydride are heated to 95° and then stirred for 1 hour at this temperature. The volatile parts are then evaporated off in vacuo, finally under high vacuum at 130°. The residue is recrystallised from methanol. It forms 22 parts of 2-acryloyl-N-methylamino-4,6-bis-N-morpholino-1,3,5-triazine. It is a colourless crystalline substance which melts at 139–140°.

The 2-methylamino-4,6-bis-N-morpholino - 1,3,5 - triazine used as starting material is obtained by reaction of 1 mol of cyanuric chloride with 2 mols of morpholine and then with 1 mol of methylamine.

EXAMPLE 4

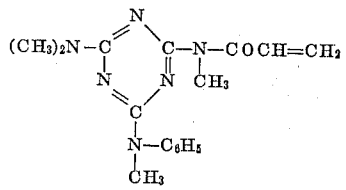

50.2 parts of 2 - methylamino - 4 - dimethylamino - 6-phenyl-N-methylamino-1,3,5-triazine, 0.3 part of hydroquinone and 50 parts of acrylic acid anhydride are slowly heated to 70° while stirring and kept for 1 hour at this temperature. The yellow liquid formed is fractionally distilled and, after separation of the low boiling fractions, 38 parts of 2-acryloyl-N-methylamino-4-dimethylamino-6-phenyl-N-methylamino - 1,3,5 - triazine (=61% of the theoretical) are obtained in the form of a colourless, highly viscose oil which boils at 175–180° under 0.03 mm. Hg. The oil solidifies at room temperature into a colourless mass which melts at 46–48°.

EXAMPLE 5

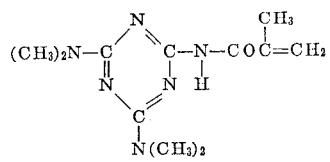

36.4 parts of 2-amino-4,6-bis-dimethylamino-1,3,5-triazine, 0.2 part of hydroquinone, 0.2 part of copper powder, 70 parts of toluene and 60 parts of methacrylic acid anhydride are slowly heated in a round flask while stirring at 95° and kept at this temperature for 1½ hours. The lower boiling components such as toluene, methacrylic acid and methacrylic acid anhydride are then evaporated off and the residue is distilled under high vacuum over a copper spiral. The distillate is recrystallised from 250 parts of ligroin. 31 parts of 2-methacryloyl-amino-4,6-bis-dimethylamino-1,3,5-triazine (62% of the theoretical) are obtained in the form of a colourless crystalline substance which boils at 168–172° under 0.02 to 0.03 mm. Hg and melts at 69–71°.

EXAMPLE 6

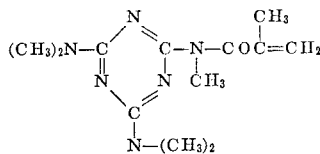

20 parts of 2-methylamino-4,6-bis-dimethylamino-1,3,5-triazine, 0.2 part of p-quinone, 40 parts of toluene and 12.5 parts of methacrylic acid chloride are refluxed in a round flask while stirring and introducing a weak stream of nitrogen. 160 parts of toluene are then added during the reaction to ensure a thorough mixing of all ingredients in the suspension. The reaction mixture is cooled down after 2 hours, the resulting precipitate (I) is separated by suction filtration and washed with 10 parts of toluene. The filtrate and the toluene used for washing are combined and washed with 200 parts of cold dilute aqueous sodium hydroxide solution, then twice with 200 parts of water and then evaporated to dryness. The residue is recrystallised successively from ligroin and petroleum ether, whereby 8,4 parts of 2-methacryloyl-N-methylamino-4,6-bis-dimethylamino-1,3,5-triazine (yield 32% of the theoretical) are obtained in the form of colourless crystals melting at 94–95°.

The precipitate (I) consists of the hydrochloride of the starting compound. After neutralising the aqueous solution of I with dilute aqueous sodium hydroxide solution, 9 parts of 2-methylamino-4,6-bis-dimethylamino-1,3,5-triazine are recovered. (Yield 45%.)

EXAMPLE 7

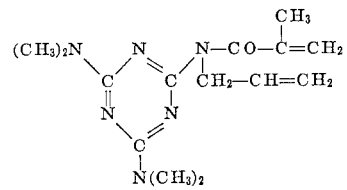

47 parts of methacrylic acid anhydride are added at room temperature to 44.5 parts of 2-allylamino-4,6-bis-dimethylamino-1,3,5-triazine and 0.2 part of hydroquinone. The reaction mixture is then heated while stirring to 75–80° and kept for 1 hour at this temperature, a stream of nitrogen being bubbled through the reaction vessel simultaneously. A viscous liquid is obtained from which the methacrylic acid and also the excess methacrylic acid anhydride are evaporated off. The residue is distilled under high vacuum nad recrystallised from petroleum ether. 36 parts of 2-methacryloyl-N-allylamino-4,6-bis-dimethylamino-1,3,5-triazine (62% of the theoretical) are obtained as colourless crystalline substance which melts at 83°.

Other acyl melamines are obtained from the starting materials given in the second and third column of the following table by following the method used in the preceding examples.

| Example No. | Aminotriazine | Acylating agent | Yield, percent | M.P. (° C.) | B.P., ° C./mm. Hg | $n_D^{25}$ |
|---|---|---|---|---|---|---|
| 8 | 2-methylamino-4,6-bisdimethylamino-1,3,5-triazine | Acrylic acid anhydride. | 75 | 75–75.5 | 150–5/0.1 | |
| 9 | 2-methylamino-4,6-bis-di-n-butylamino-1,3,5-triazine. | do | 69 | | 186–9/0.1 | 1.5167 |
| 10 | 2-n-propylamino-4,6-bis-dimethylamino-1,3,5-triazine. | do | 72 | 58–59 | 150/0.01 | |
| 11 | 2-n-butylamino-4,6-bis-di-n-butylamino-1,3,5-triazine. | do | 54 | 35–36 | 209–12/0.1–0.2 | 1.5102 |
| 12 | 2-amino-4,6-bis-diethylamino-1,3,5-triazine | do | 47 | 56–58 | 160–2/0.1 | |
| 13 | 2-n-octadecylamino-4,6-bis-dimethyl-amino-1,3,5-triazine. | do | 72 | 38–39 | | |
| 14 | 2-methylamino-4,6-bis-di-n-dodecyl-amino-1,3,5-triazine. | do | 68 | 25–26 | | |
| 15 | 2-methylamino-4-dimethylamino-6-di-iso-propylamino-1,3,5-triazine. | do | 63 | 72–73 | 162–5/0.1 | 1.5432 |
| 16 | 2-methylamino-4-dimethyl-amino-6-diallylamino-1,3,5-triazine. | do | 62 | | 168/0.1 | 1.5585 |
| 17 | 2-allylamino-4,6-bis-dimethylamino-1,3,5-triazine. | do | 55 | 45–47 | 150–5/0.1 | |
| 18 | 2-methylamino-4-di-ethylamino-6-di-n-butylamino-1,3,5-triazine. | do | 62 | | 182–6/0.1 | 1.5251 |
| 19 | 2-n-butylamino-4,6-bis-diethylamino-1,3,5-triazine. | do | 75 | | 172–6/0.05 | 1.5252 |
| 20 | 2-ethylamino-4,6-bis-dimethylamino-1,3,5-triazine. | do | 65 | 70–72 | 130/0.05 | 1.5252 |
| 21 | 2-methylamino-4,6-bis-dicyclohexylamino-1,3,5-triazine. | do | 42 | 207–209 | | |
| 22 | 2-methylamino-4,6-di-N-piperidino-1,3,5-triazine. | do | 45 | 83–85 | 215/0.1 | |
| 23 | 2-methylamino-4,6-bis-N-morpholino-1,3,5-triazine. | do | 43 | 139–140 | | |
| 24 | 2-γ-methoxypropylamino-4,6-bis-dimethyl-amino-1,3,5-triazine. | do | 65 | 36–38 | 166–170/0.01–0.02 | |
| 25 | 2-phenylamino-4,6-bis-dimethylamino-1,3,5-triazine. | do | 65 | 105–107 | | |

| Example No. | Aminotriazine | Acylating agent | Yield, percent | M.P. (° C.) | B.P., ° C./mm. Hg | $n_D^{25}$ |
|---|---|---|---|---|---|---|
| 26 | 2-benzylamino-4,6-bis-dimethylamino-1,3,5-triazine. | ....do.............. | 44 | 96–98 | | |
| 27 | 2-methylamino-4-dimethylamino-6-o-tolyl-N-ethylamino-1,3,5-triazine. | ....do.............. | 67 | | 187–91/0.01 | 1.5833 |
| 28 | 2-m-trifluoromethylphenylamino-4,6-bis-dimethylamino-1,3,5-triazine. | ....do.............. | 37 | 86–87 | | |
| 29 | 2-γ-methoxy-n-propylamino-4,6-bis-di-n-propylamino-1,3,5-triazine. | ....do.............. | 74 | | 196–200/0.01 | 1.5174 |
| 30 | 2-amino-4,6-bis-di-n-propylamino-1,3,5-triazine. | ....do.............. | 59 | 97–98 | 170–73/0.01 | |
| 31 | 2-amino-4,6-bis-di-n-butylamino-1,3,5-triazine. | ....do.............. | 57 | 70–71.5 | 190–94/0.08 | |
| 32 | 2-n-propylamino-4,6-bis-dimethylamino-1,3,5-triazine. | methacryl acid chloride. | 10 | 37–40 | | |
| 33 | 2-amino-4-dimethylamino-6-diethylamino-1,3,5-triazine. | methacryl acid anhydride. | 46 | | 174–78/0.001 | |
| 34 | 2-amino-4,6-bis-N-morpholino-1,3,5-triazine. | ....do.............. | 14 | 135–36 | | |
| 35 | 2-amino-4-dimethylamino-6-di-β-cyanoethylamino-1,3,5-triazine. | ....do.............. | 66 | 134–134.5 | | |
| 36 | 2-ethylamino-4-diethylamino-6-di-β-cyanoethylamino-1,3,5-triazine. | ....do.............. | 68 | | 205–7/0.1 | |

| Example No. | Aminotriazine | Acylating agent |
|---|---|---|
| 37 | 2-oleylamino-4,6-bisdimethylamino-1,3,5-triazine. | Acrylic acid anhydride. |
| 38 | 2-cyclopenthylamino-4,6-bis-diethylamino-1,3,5-triazine. | Do. |
| 39 | 2-3',4'-dimethylcyclohexylamino-4,6-bis-dimethylamino-1,3,5-triazine. | Do. |
| 40 | 2-γ-phenylpropylamino-4,6-bis-diethylamino-1,3,5-triazine. | Do. |
| 41 | 2-p-methylbenzylamino-4,6-bis-diethylamino-1,3,5-triazine. | Do. |
| 42 | 2-o-chlorophenylamino-4,6-bis-diethylamino-1,3,5-triazine. | Do. |
| 43 | 2-methylamino-4-p-chlorobenzyl-N-methylamino-6-dimethylamino-1,3,5-triazine. | Do. |
| 44 | 2-p-bromophenylamino-4,6-bis-dimethylamino-1,3,5-triazine. | Do. |
| 45 | 2-p-bromobenzylamino-4,6-bis-dimethylamino-1,3,5-triazine. | Methacryl acid anhydride. |
| 46 | 2-p-fluorophenylamino-4,6-bis-dimethylamino-1,3,5-triazine. | Acrylic acid anhydride. |
| 47 | 2-o-fluorobenzylamino-4,6-bis-dimethylamino-1,3,5-traizine. | Do. |
| 48 | 2-p-ethoxyphenylamino-4,6-bis-dimethylamino-1,3,5-triazine. | Do. |
| 49 | 2-p-methoxybenzylamino-4,6-bis-dimethylamino-1,3,5-triazine. | Methacrylic acid anhydride. |
| 50 | 2-methylamino-4,6-bish-N-pyrrolidino-1,3,5-triazine. | Do. |
| 51 | 2-methylamino-4-N-hexamethylene-imino-6-dimethyl-amino-1-3,5-triazine. | Acrylic acid anhydride. |

EXAMPLE 52

Substance polymer from 2-acryloyl-N-methylamino-4-dimethylamino-6-phenyl-N-methylamino-1,3,5-triazine A mixture of 3 parts of 2-acryloyl-N-methylamino-4-dimethylamino-6-phenyl-N-methylamino - 1,3,5 - triazine (Example 4) and 0.003 part of 2-azo-isobutyronitrile is placed in a glass reaction tube. The reaction tube is then washed out with nitrogen, sealed by melting down the ends of the tube, and kept for 24 hours in a water bath at 60°. Thereby, 3 parts of a clear, transparent and hard mass of poly-(2-acryloyl-N-methylamino-4-dimethylamino-6-phenyl-N-methylamino-1,3,5-triazine) are obtained. The polymerizate produced in this manner is capable of swelling, but is practically insoluble in such organic solvents as benzene, tetrahydrofuran, chloroform and glacial acetic acid at room temperature. It is partially soluble in dimethyl formamide. The product begins to soften only at above 130°. When the polymerization is carried out in the presence of 0.015 part of 2-azo-di-iso-butyronitrile and 9 parts of tert. butanol, a milky emulsion is obtained. The emulsion is stirred into a mixture of 170 parts of methanol and 30 parts of water. The polymerizate which precipitates after a short time is collected, washed with 50 parts of methanol and dried for 12 hours at 70° under 3 mm. Hg pressure. 2.8 parts of the polymer is obtained as a colourless, powdery substance which begins to soften above 190°.

EXAMPLE 53

Copolymer from methacrylic acid methyl ester and 2-acryloyl - N - methylamino - 4,6 - bis-dimethylamino-1,3,5-triazine 4 parts of methacrylic acid methyl ester, 1 part of 2-acryloyl-N-methylamino - 4,6 - bis-dimethylamino-1,3,5-triazine and 0.005 part of 2-azo-isobutyronitrile are treated as described in Example 52. 5 parts of a copolymer are obtained as a glass-clear hard block. The copolymer is composed of the monomers given above.

EXAMPLE 54

Copolymer from methacrylic acid methyl ester and 2-methacryloyl-N-methylamino-4,6 - bis-dimethylamino-1,3,5-triazine 3.75 parts of methacryl acid methyl ester, 1.25 parts of 2-methacryloyl - N - methylamino-4,6-bis-dimethylamino-1,3,5-triazine (Example 6) and 0.06 part of dilauroyl peroxide are placed in a glass reactor. The mixture is cooled in an ice sodium chloride mixture, the reaction tube is washed out with nitrogen, sealed hermetically and kept for 96 hours in a water bath at a temperature of 60°. 5 parts of a compact, clear mass are then obtained. It is soluble in benzene and tetrahydrofuran.

2 parts of this product are dissolved in 40 parts of tetrahydrofuran and then the solution is added dropwise while stirring to 300 parts of methanol. The precipitate formed is filtered off under suction, washed with 40 parts of methanol and dried for 50 hours at a pressure of 3 mm. Hg at 80°. Thereby, 1.5 parts of a colourless flaky product are obtained which is a purified copolymerizate derived from the monomers given above. The copolymerizate contains 3.14% of nitrogen which corresponds to a content of 9.9% of non-copolymerized 3-methacryloyl-N-methylamino-4,6-bis-dimethylamino-1,3,5-triazine.

EXAMPLE 55

Copolymer from 2 - acryloylamino-4,6-bis-diethylamino-1,3,5-triazine and 2-acryloyl-N-methylamino-4,6-bis-di-n-butylamino-1,3,5-triazine 4 parts of 2-acryloylamino-4,6-bis-diethylamino-1,3,5-triazine (Example 12), 2 parts of 2-acryloyl-N-methylamino-4,6-bis-di-n-butylamino - 1,3,5 - triazine (Example 9), 18 parts of toluene and 0.03 part of 2-azoisobutyronitrile are sealed in a glass tube as described in Example 54 and kept at 75° for 24 hours. When the viscous solution so formed is poured onto a glass plate and first dried for 6 hours at room temperature and then for 30 minutes at 130–140°, a colourles and non-sticky sheet is obtained which adheres well to the glass plate. The hardness to scratching of this sheet measured by the Wolff-Wieborn pencil test corresponds to the degree of hardness of a Faber-Castell HB pencil.

EXAMPLE 56

Copolymer from vinylidene chloride and 2-acryloyl-N-methylamino-4,6-bis-dimethylamino-1,3,5-triazine 2 parts of vinylidene chloride, 3 parts of 2-acryloyl-N-methylamino-4,6-bis-dimethylamino - 1,3,5 - triazine (Example 8) and 0.005 part of 2-azo-isobutyronitrile are treated as described in Example 54, but for only 24 hours, whereby 5 parts of a compact hard, solid polymerizate of amber color are obtained which consists of a copolymer from the monomers mentioned above.

2 parts of this polymerizate are dissolved in 21 parts of benzene. When this solution is poured onto a glass plate and dried for 30 minutes at 100° after standing for 2 hours at room temperature, a non-sticky transparent coating of pale yellow color is obtained. The hardness to scratching of the coating corresponds to the degree of hardness of a Faber-Castell 6H pencil.

EXAMPLE 57

Polymer from 2-methacryloylamino-4,6-bis-dimethylamino-1,3,5-triazine 6 parts of 2-methacryloylamino-4,6-bis-dimethylamino-1,3,5-triazine (Example 5), 24 parts of tert. butanol and 0.01 part of 2-azoisobutyronitrile are placed in a glass reactor. The mixture is cooled in an ice sodium chloride mixture, the reaction tube is washed out with nitrogen, sealed hermetically and kept for 96 hours in a water bath at a temperature of 60° C., and the homogeneous solution is heated for 72 hours at 60°. The polymer which precipitates from the solution, is filtered off under suction, washed with 50 parts of methanol and dried for 12 hours at 70°. Thereby, 5 parts of poly-(2-methacryloylamino - 4,6 - bis-dimethylamino-1,3,5-triazine) are obtained as a colorless, pulverulent substance which fuses above 220°. The polymer is soluble in benzene, dimethylformamide and tetrahydrofurane, and insoluble in methanol. The product is re-precipitated twice from tetrahydrofuran/methanol (volume ratio about 1:10) and dried as described in Example 54. The intrinsic viscosities of this product are:

$[\eta]=0.28$ (tetrahydrofuran, 25°)
$[\eta]=0.34$ (dimethylformamide, 25°)

The molecular weight of the polymerizate is about 36,000.

EXAMPLE 58

Polymer from 2-acryloyl-N-allylamino-4,6-bis-dimethylamino-1,3,5-triazine 3 parts of 2-acrylol-N-allylamino-4,6-bis-dimethylamino-1,3,5-triazine (Example 17), 12 parts of toluene and 0.012 part of 2-azoisobutyronitrile are placed in a glass reactor. The mixture is cooled in an ice sodium chloride mixture, the reaction tube is washed out with nitrogen, sealed hermetically and kept for 96 hours in a water bath heated at 60°. The toluene is evaporated from the resulting viscous solution, the residue is dissolved in 20 parts of tetrahydrofuran and the resulting solution is added drop by drop to a mixture of 180 parts of methanol and 20 parts of water. The precipitate formed is then filtered off, washed with 20 parts of methanol and dried for 12 hours under reduced pressure of 12 mm. Hg at 70°. Thereby, 2.55 parts (85% of the theoretical) of poly-(2-acryloyl - N - allylamino-4,6-bis-dimethylamino-1,3,5-triazine) are obtained as a colorless powder. It is easily soluble in benzene, tetrahydrofuran and chloroform, and softens at 180°.

EXAMPLE 59

Copolymer from 2-acryloyl-N-methylamino-4,6-dimethylamino-1,3,5-triazine and 2-acryloyl-N-methylamino-4,6-bis-di-n-butylamino-1,3,5-triazine 2.5 parts of 2-acryloyl-N-methylamino-4,6-bis-dimethylamino-1,3,5-triazine (Example 8), 3.5 parts of 2-acryloyl-N - methylamino - 4,6-bis-di-n-butylamino-1,3,5-triazine (Example 9), 15 parts of benzene and 0.03 part of 2-azoisobutyronitrile are sealed in a glass tube as described in Example 54, and heated for 24 hours at 60° C. A clear colourless, viscous solution is obtained. When this solution is poured onto a glass plate and heated for 30 minutes to 130–140° after standing for 6 hours at room temperature, a glass-clear, hard film is formed which is a copolymer from 2-acryloyl-N-methylamino-4,6-bis-dimethylamino-1,3,5-triazine and 2-acryloyl-N-methylamino-4,6-bis-di-n-butylamino-1,3,5-triazine.

EXAMPLE 60

Copolymer from methylacrylic acid nonyl ester and 2-acryloyl - N-methylamino-4,6-bis-N-morpholino-1,3,5-triazine 7 parts of methacrylic acid nonyl ester, 3 parts of 2-acryloyl - N-methylamino-4,6-bis-N-morpholino-1,3,5-triazine (Example 3), 30 parts of butanol and 0.5 part of 2-azoisobutyronitrile are placed in a three-necked flask fitted with a stirrer, gas introduction tube and reflux condenser. The solution is kept for 12 hours at 75° while stirring and bubbling through a stream of nitrogen, whereby a water-clear syrup is formed. Films produced from this syrup, as described in Example 59 consist of a copolymer from methacrylic acid nonyl ester and 2-acryloyl-N-methylamino-4,6-bis-N-morpholino-1,3,5-triazine; they are moderately hard, glass-clear and not sticky. The hardness to scratching of these films corresponds to that of an HB pencil of the Faber-Castell scale of hardness.

EXAMPLE 61

Copolymer from 2-acryloyl-N-methylamino-4,6-bis-diethylamino-1,3,5-triazine, styrene and acrylic acid butyl ester 2 parts of 2-acryloyl-N-methylamino-4,6-bis-diethylamino-1,3,5-triazine (Example 1), 4 parts of styrene, 4 parts of acrylic acid butyl ester, 0.4 part of 2-azo-isobutyronitrile and 30 parts of ethylene glycol monomethyl ester are refluxed for 6 hours (oil bath temperature about 128°) under a nitrogen atmosphere in a round flask fitted with a condenser. The clear, pale yellowish liquid formed after this time is drawn into a film on a glass plate and dried for 30 minutes at 130–140°. The dried film, which is a copolymer from 2-acryloyl-N-methylamino-4,6-bis-diethyl amino-1,3,5-triazine, styrene and acrylic acid butyl ester, is clear, soft and sticky. The product of this example is suitable as an adhesive.

EXAMPLE 62

Copolymer from 2-acryloyl-N-methylamino-4-dimethylamino-6-phenyl-N-methylamino-1,3,5-triazine and styrene 8 parts of styrene, 2 parts of 2-acryloyl-N-methylamino - 4-dimethylamoino-6-phenyl-N-methylamino-1,3, 5-triazine (Example 4) and 40 parts of a 1% aqueous polyvinyl alcohol solution (for instance Movinol N50-88) are placed in a three-necked flask fitted with stirrer, reflux condenser and gas introduction tube. A strong stream of nitrogen is passed for 30 minutes over the surface of the liquid. The stream of nitrogen is then reduced to 2 to 3 bubbles per second and the reaction mixture is heated while stirring vigorously in a water bath at 50°. 0.2 part of dilauroyl peroxide is added to the suspension and the polymer is left to form for 12 hours. The resulting solid product is then filtered off under suction and washed first with 500 parts of water and then with 20 parts of methanol. After drying for 4 hours at 70°, 8.9 parts of a copolymer from 2 - acryloyl - N - methylamino-4-di-methylamino-6-phenyl-N-methylamino-1,3,5-triazine and styrene are obtained as a colourless fine granulate. The granulate is worked up into a glassy block at 150° under 100 atmospheres pressure.

EXAMPLE 63

Copolymer from 2-acryloyl-N-methylamino-4,6-bis-diethylamino-1,3,5-triazine and acrylonitrile 6 parts of 2-acryloyl-N-methylamino-4,6-bis-diethylamino-1,3,5-triazine (Example 1), 4 parts of acrylonitrile, 3 parts of sodium sulphate and 30 parts of a 0.5% aqueous starch solution are placed in a three-necked flask fitted with stirrer, reflux condenser and gas introduction tube. As described in Example 62, air is removed from the reaction vessel with nitrogen and the reaction mixture is headed to 50°. 0.3 part of dilauroyl peroxide is added to the suspension and the polymer is left to form for 6 hours while stirring. The polymer formed is filtered off under suction, washed first with 30 parts of methanol and then with 100 parts of water and dried for 6 hours at 60° under 12 mm. Hg. In this way, 9.1 parts (91% of the theoretical) of a copolymer from 2-acryloyl-N-methyl-amino-4,6-bis-diethylamino-1,3,5-triazine and acrylonitrile are obtained as a pale yellow fine granulate.

EXAMPLE 64

A polymer obtained from a solution of 2-acryloylamino-4,6-bis-di-n-butylamino-1,3,5-triazine 15 parts of 2-acryloylamino-4,6-bis-di-n-butylamino-1,3,5-triazine (Example 31), 0.075 part of 2-azoisobutyronitrile and 60 parts of tert. butanol are treated as described in Example 54, and the various polymer solution formed is then poured while stirring into 300 parts of methanol. The polymerizate is then precipitated. The supernatant solution is then poured off, the precipitate washed with 100 parts of methanol and dried for 12 hours at 60° under a reduced pressure of 12 mm. Hg. 11.6 parts (77%) of a hard voluminous mass are obtained from which a film can be produced according to the method described in Example 59. The film is clear and colourless, and adheres well to glass. The product of this example can thus be used as intermediate layer for glass.

EXAMPLE 65

Polymerization of 2-acryloyl-N-n-butylamino-4,6-bis-diethylamino-1,3,5-triazine in aqueous emulsion 10 parts of 2-acryloyl-N-n-butylamino-4,6-bis-diethylamino-1,3,5-triabine (Example 19) are suspended in 50 parts of a 1.5% aqueous solution of the sodium salt of sulphosuccinic acid dioctyl ester, in a three-necked flask fitted with stirrer, gas-conducting tube and reflux condenser. 0.2 part of potassium peroxy-disulphate ($K_2S_2O_8$) is then added, the reaction vessel is flushed with nitrogen and placed in a bath maintained at a constant temperature of 50°. The reaction mixture is stirred for 18 hours and the polymeric emulsion formed is precipitated by being poured, while stirring, into 200 parts of methanol. The precipitate is washed three times with 50 parts of hot water each time and dried under reduced pressure for 12 hours at 100°, whereby 8.5 parts of a colourless powder are obtained.

EXAMPLE 66

Polymerization of 2 - acryloyl - N-γ-methoxy-n-propyl-amino-4,6-bis-di-n-propylamino-1,3,5-triazine in aqueous emulsion 10 parts of 2-acryloyl-N-γ-methoxy-n-propylamino-4,6-bis-di-n-propylamino-1,3,5-triazine (Example 29) are suspended in 100 parts of a 1% aqueous solution of the sodium salt of sulphosuccinic acid dioctyl ester and 0.2 part of potassium peroxy-disulphate is then added thereto. The reaction vessel is flushed with nitrogen, placed in a bath, held at a constant temperature of 50°, and the reaction mixture is then stirred for 18 hours. The polymeric emulsion formed is coagulated by pouring it into 300 parts of methanol, the resulting precipitate is washed three times with 50 parts of hot water each time and collected in a filter. After being dried at 70° under reduced pressure, the polymer is obtained as a colourless, white powder.

EXAMPLE 67

Polymer from 2-acryloyl-N-methylamino-4,6-bis-dimethylamino-1,3,5-triazine 6 parts of 2-acryloyl-N-methylamino-4,6-bis-dimethylamino-1,3,5-triazine (Example 8), 24 part sof t-butanol and 0.01 part of 2-azoisobutyronitrile are sealed in a glass tube, as described in Example 54, and the homogeneous solution is heated for 72 hours at 60°. The polymer which precipitates from the solution, is filtered off under suction and washed with 50 parts of methanol. It is then reprecipitated twice from tetrahydrofuran/methanol and dried as described in Example 54, yielding 5.7 parts of poly (2-acryloyl-N-methylamino - 4,6 - bis-dimethylamino-1,3,5-triazine). The intrinsic viscosity of this product is $[\eta]=0.49$ (chloroform, 25°).

The molecular weight of the polymerizate is about 32,000.

Similar polymerization products are obtained by repeating the above Examples 52 to 67 but using in lieu of the triazine-monomers employed therein an equal amount of the other triazine monomers produced as described in Examples 1 to 51, respectively.

Similar copolymerizates to those described in Examples 53, 54, 56, 60, 61, 62 and 63, are produced by replacing the copolymerizable ethylenic monomer, e.g. methyl methacrylate in Example 53, by (a) 2 parts, (b) 4 parts, (c) 10 parts of each of the other copolymerizable ethylenic monomers listed below: chlorostyrene, bromostyrene, fluorostyrene, methylstyrene, trifluoromethyl styrene, vinyl acetate, vinyl benzoate;

And, in accordance with Example 56 by solution polymerization, and by replacing the 2 parts of the second triazine monomer named therein, by the same amount of vinylidene cyanide;

And, in accordance with Example 63, by carrying out the polymerization described therein in an autoclave at the temperature given in the example, but replacing the 8 parts of styrene by 2 parts of vinyl chloride and simultaneously preventing loss of vinyl chloride during the flushing with nitrogen by cooling the entire autoclave to −20° C., and then closing the same and interrupting the nitrogen stream, after addition of lauryl peroxide.

I claim:
1. A polymer consisting essentially of
(a) repeating units of the formula

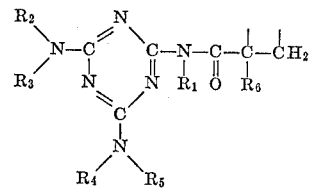

wherein
$R_1$ is a member selected from the group consisting of hydrogen and $R_2$;
each of $R_2$, $R_3$, $R_4$ and $R_5$, independently, is a member selected from the group consisting of alkyl with maximally 18 carbon atoms, alkenyl with at least 3 and maximally 18 carbon atoms, lower alkoxy-lower alkyl, cyanoethyl, cycloalkyl of from 5 to 7 ring carbon atoms, a lower alkyl-cycloalkyl radical with 5 to 7 ring carbon atoms and a total of 6 to 10 carbon atoms, trifluoromethyl-phenyl, an unsubstituted (mono-nuclear carbocyclic aryl)-aliphatic radical with from 7 to 10 carbon atoms, an unsubstituted mono-nuclear carbocyclic aromatic radical, and each of the 2 last-mentioned members substituted with a member selected from the group consisting of lower alkyl, chloro, bromo, fluoro, lower alkoxy;

or one or both of the pairs $R_2+R_3$ taken together, and $R_4+R_5$ taken together, represents a bi-valent radical selected from the group consisting of tetramethylene, pentamethylene, hexamethylene and ethyleneoxy-ethylene, $R_6$ is a member selected from the group consisting of hydrogen and alkyl with maximally 3 carbon atoms, with the proviso that at least one of $R_1$ and $R_6$ is hydrogen, and (b) from 0 to 95% by weight, calculated on the total weight of the polymer, of repeating units which are each a divalent radical obtained from an ethylenically unsaturated co-monomer selected from the group consisting of styrene, chlorostyrene, bromo styrene, fluorostyrene, methylstyrene, ethylstyrene, cyanostyrene, trifluoromethylstyrene, an alkyl ester of acrylic acid and an alkylester of methacrylic acid, in each of which alkyl has maximally 9 carbon atoms, acrylonitrile, methacrylonitrile, vinylidene chloride, vinylidene cyanide, vinyl halide, a vinyl lower alkanoate and vinyl benzoate, by opening of the ethylenic double bond thereof.

2. A polymerizate as defined in claim 1, wherein each of $R_1$, $R_2$, $R_3$ and $R_4$ is methyl, $R_5$ is phenyl and $R_6$ is hydrogen.

3. A polymerizate as defined in claim 1, wherein each of $R_2$, $R_3$, $R_4$ and $R_5$ is n-butyl, and each of $R_1$ and $R_6$ is hydrogen.

4. A polymerizate as defined in claim 1 being a copolymerizate of a first repeating unit wherein each of $R_1$, $R_2$, $R_3$, $R_4$ and $R_5$ is methyl and $R_6$ is hydrogen, and a second repeating unit wherein $R_1$ is methyl, each of $R_2$, $R_3$, $R_4$ and $R_5$ is n-butyl and $R_6$ hydrogen, the weight ratio of all of said first repeating units to all of said second repeating units being about 2.5 to 3.5.

5. A polymerizate as defined in claim 1, wherein each of $R_1$, $R_2$, $R_3$ and $R_4$ in the formula of the first-mentioned repeating units is methyl, $R_5$ is phenyl and $R_6$ is hydrogen, and the co-monomer is styrene.

6. A polymerizate as defined in claim 5, wherein the weight ratio of said first-mentioned repeating units to the repeating units obtained from styrene is about 1:4.

7. A compound of the formula

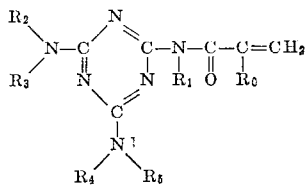

wherein $R_1$ is a member selected from the group consisting of hydrogen and $R_2$;

each of $R_2$, $R_3$, $R_4$ and $R_5$, independently, is a member selected from the group consisting of alkyl with maximally 18 carbon atoms, alkenyl with at least 3 and maximally 18 carbon atoms, lower alkoxy-lower alkyl, cyanoethyl, cycloalkyl of from 5 to 7 ring carbon atoms, a lower alkyl-cycloalkyl radical with 5 to 7 ring carbon atoms and a total of 6 to 10 carbon atoms, trifluoromethylphenyl, an unsubstituted (mono-nuclear carbocyclic aryl)-aliphatic radical with from 7 to 10 carbon atoms, an unsubstituted mono-nuclear carbocyclic aromatic radical, and each of the 2 last-mentioned members substituted with a member selected from the group consisting of lower alkyl, chloro, bromo, fluoro, lower alkoxy;

or one or both of the pairs $R_2+R_3$ taken together, and $R_4+R_5$ taken together, represents a bi-valent radical selected from the group consisting of tetramethylene, pentamethylene, hexamethylene and ethyleneoxy-ethylene, and $R_6$ is a member selected from the group consisting of hydrogen and alkyl with maximally 3 carbon atoms, with the proviso that at least one of $R_1$ and $R_6$ is hydrogen.

8. A compound as defined in claim 7, wherein each of $R_1$, $R_2$, $R_3$ and $R_4$ is methyl, $R_5$ is phenyl and $R_6$ is hydrogen.

9. A compound as defined in claim 7, wherein each of $R_1$, $R_2$, $R_3$, $R_4$ and $R_5$ is methyl and $R_6$ is hydrogen.

10. A compound as defined in claim 7, wherein each of $R_1$ and $R_6$ is hydrogen and each of $R_2$, $R_3$, $R_4$ and $R_5$ is n-butyl.

11. A compound as defined in claim 7, wherein $R_1$ is methyl, each of $R_2$, $R_3$, $R_4$ and $R_5$ is n-butyl and $R_6$ is hydrogen.

No references cited.

JOSEPH L. SCHOFER, *Primary Examiner.*

J. KIGHT, *Assistant Examiner.*

U.S. Cl. X.R.

260—78.5, 80, 80.3, 82.1, 85.5, 85.7, 86.1, 88.3, 153, 249.5, 249.6